Sept. 6, 1955 J. M. BLACKHALL ET AL 2,717,278

IMPULSE CIRCUIT FOR AUTOMATIC TELEPHONE SYSTEM

Filed Feb. 26, 1951

INVENTORS.
JAMES M. BLACKHALL
DONALD S. BAKER
PER O. DAHLMAN
BY Brown, Jackson, Boettcher & Dienner
ATTORNEYS United States Patent Office 2,717,278

Patented Sept. 6, 1955

2,717,278

IMPULSE CIRCUIT FOR AUTOMATIC TELEPHONE SYSTEM

James M. Blackhall, Galion, and Donald S. Baker and Per Olaf Dahlman, Kenton, Ohio, assignors to The North Electric Manufacturing Company, Galion, Ohio, a corporation of Ohio Application February 26, 1951, Serial No. 212,808

12 Claims. (Cl. 179—16)

Figures 1, 2:
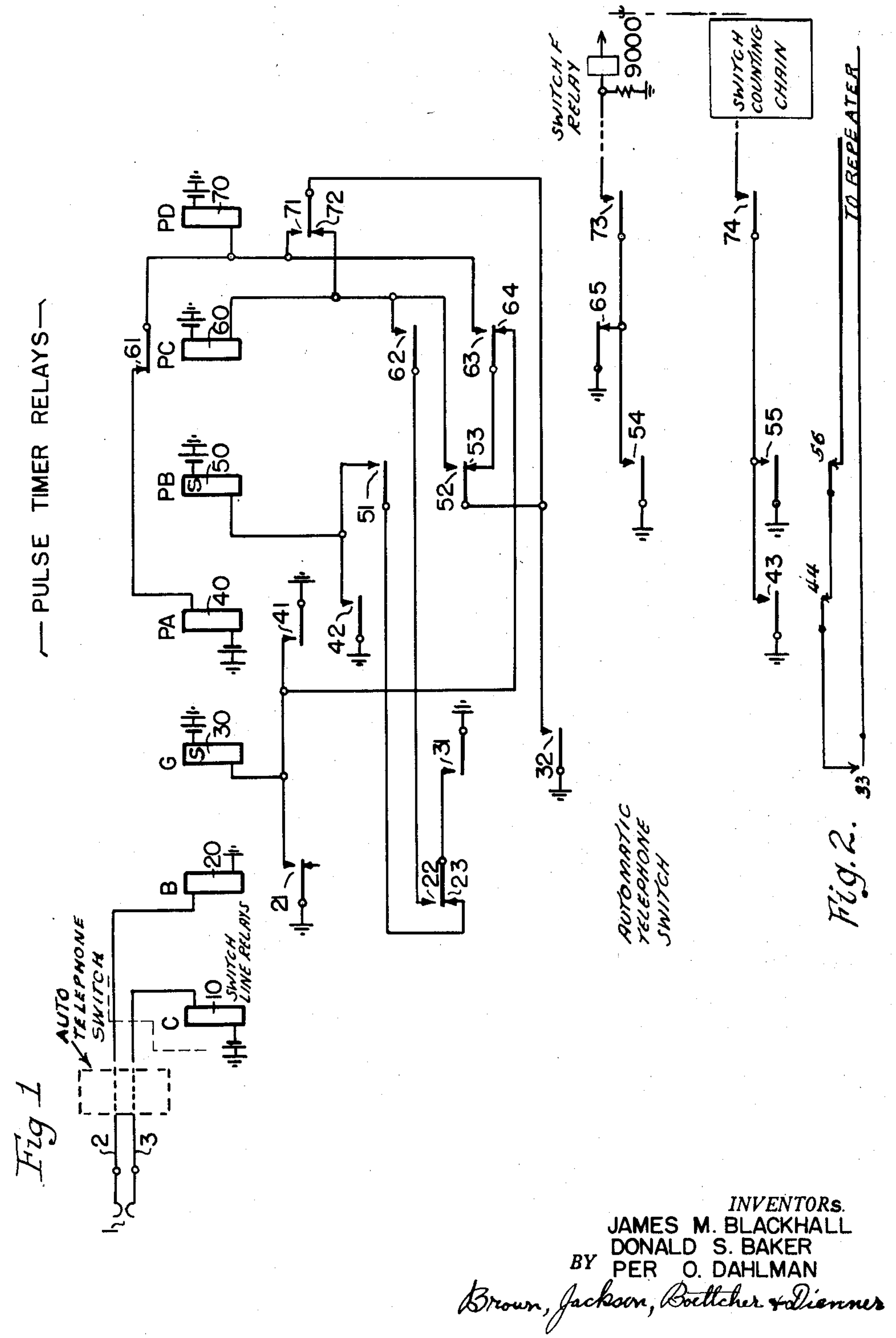

The present invention relates in general to automatic telephone systems, and more particularly to a novel impuse correcting arrangement which is especially adapted for use with the various automatic switches of an automatic telephone exchange.

In most conventional types of automatic telephone exchange equipment each subscriber substation is equipped with an impulse transmitting device, such as a dial impulsing unit, which is adapted with registration thereon of the directory number of a desired party to transmit a corresponding group of impulses over an associated line loop to a plurality of automatic switches which are centrally located in the exchange. The automatic switches are, in turn, operative with receipt of the incoming impulses to selectively seize the line having the directory number transmitted. A communication link between the called and calling parties is then completed by the switching equipment.

The automatic switches which respond to these impulses may be alternatively of the relay type or the so-called switch type. In both types of systems the switching equipment is of a mechanical nature.

A primary requisite in achievement of consistent type operation with mechanical switches is the establishment of a "standard" operating impulse and the initial adjustment of the switches to such standard. In the field today, therefore, the dial equipment is generally designed to transmit, and the switching equipment is adjusted to respond to impulses having a make to break ratio of 60–40% and having a rate of speed in transmission of 10 pulses per second.

Receipt by the switching equipment of impulses which vary in value from these standards will effect improper operation of the switches and it is to the minimization of improper operation resulting from receipt of the variable type impulses that the present invention is directed.

Variations in the operational impulses in an exchange may be introduced generally at three basic points in the system, such points including the dial impulse generating mechanism at the subscriber substations, the line loop connecting the stations to the switches and the source of operating potential for the system.

Variations in the impulse characteristics as generated at the substations are frequently experienced, for example, as a result of undue wear of the mechanical parts of the dial mechanism or the accumulation of dust and dirt on the working parts thereof.

Impulse distortion or variation is also frequently caused in transmission by the high capacitance, high inductance, or high resistance which may be inherent in the line loop which interconnects the substations to the switching equipment.

Fluctuation of the valve of the potential supply source may also cause improper response of the receiving equipment in the automatic switches.

The primary object of the present invention, therefore, is to provide a novel improved system arrangement which minimizes improper response of the equipment should variations in the characteristics of the impulses be experienced.

It is a specific object to provide impulse correcting equipment which accepts the existence of impulses having variations in the described characteristics and which is operative with detection thereof to provide impulses of the accepted characteristics.

It is another object to provide improved equipment of this general type which is operative with the selector, connector, or trunking equipment of an automatic exchange whereby such switching equipment is rendered, for all practical purposes, independent of large variations in dial speed, dial percentage, line loads, line lengths, and battery voltage.

As is well known in the art, the use of common control equipment for a group of automatic switches eliminates a large amount of conventional costly equipment which is used only momentarily in extension of each call and then is held idle and useless for the remainder of that call.

Briefly, the call extending equipment of a conventional exchange is used for approximately from .5 to 2 seconds in effecting the extension of a call, and is then held in the idle condition until the subscribers have finished. According to the principle of common control, common call extension equipment is associated with a group of selectors or connectors switches which is operative to extend a call through one of the groups as selected and to release as soon as the call is established to permit its use with another switch in the group immediately thereafter.

It is apparent that in the establishment of calls in from .5 to 2 seconds over a control circuit common to a group of switches, it is important that the impulse corrector circuit be extremely fast in operation responsive to seizure of the switch with which it is associated, and a particular feature of the invention is the provision of an impulse correcting unit which is adapted for operation with such type switching equipment.

Other features of the impulse correcting arrangement are set forth in the following general description when considered with schematic presentation thereof in Figures 1 and 2 of the accompanying drawing.

*General circuit description*

The impulse correction arrangement of the invention basically comprises an input circuit over which the equipment is seized and to which the incoming impulses are applied; relay means responsive to seizure of the circuit to prepare outgoing circuits to associated switching equipment; and impulse generating means for generating and transmitting corrected impulses of the desired characteristics over the outgoing circuits.

The impulse generating means basically comprise a set of three timer relays, one of which is energized on seizure of the impulse corrector equipment and which is operative in a dual capacity with each receipt of an incoming impulse thereafter. Generally speaking, the operations of this dual function relay may be considered as a triggering operation in which it effects triggering of the impulse generating relays whenever an incoming impulse is received over the incoming line, and a timing operation in which it operates with the impulse generating relay subsequent to each triggering action to serve as a timer relay in determining the characteristics of the corrected outgoing impulse.

Briefly, the trigger relay follows the line relay of the arrangement and with each release thereof responsive to receipt of an incoming impulse controls the operation in a given sequence of the other two timer relays. The two timer relays operate in the given sequence and further the sequence by effecting reoperation of the trigger relay which in turn controls release of the first two timer relays in the order in which they were operated. The sequence is then terminated and the outgoing corrected impulse is completed. In the disclosed arrangement two outgoing circuits are illustrated and corrected pulses of different duration are sent over the circuits with each operation of the timer relays sequence, the pulse in the first outgoing circuit being initiated as the trigger relay releases, and the pulse in the second circuit being initiated as the first sequence relay operates. Both outgoing pulses are terminated as the second timer relay releases.

It is apparent from the foregoing that the duration of the first outgoing pulse is determined by the operating time of the initial sequence relay, the operating time of the second impulse relay, the operating time of the trigger relay, and the release time of the initial and second sequence relays. The impulse on the second outgoing circuit is shortened by a length equivalent to the operating time of the first sequence relay.

Further outgoing circuits may, of course, be added and the duration of the outgoing impulses varied over an extremely large range.

As will become apparent hereinafter, with the receipt of an impulse of an exceedingly long duration the equipment is operative to provide an outgoing impulse of slightly greater duration than that of the normal impulses.

The above described arrangement in which one of the timer relays is effective in determining the duration of the outgoing corrected impulses, as well as triggering the impulse generation, provides a system in which a maximum range of impulse value limits is effected with a minimum number of relays. The system is of an extremely economical nature and because of its simplicity is well adapted for use with numerous types of impulsing equipment.

*Specific description*

With reference now to Figure 1, the novel impulse corrector arrangement as shown thereat is adapted for use with the switching equipment set forth in the automatic telephone system disclosed in the application directed to "Automatic Telephone System," filed May 12, 1950, and identified by Serial No. 161,677. The equipment as shown in the drawing is also adapted for operation with the selector common control equipment. The use of the impulse correcting arrangement with trunk repeating equipment, as well as other switching equipment, is believed obvious from such disclosure.

In establishing a call in conventional automatic telephone systems, the subscriber removes his handset from the substation unit to complete an energizing circuit for an associated line circuit. The line finder circuit operates and as an idle finder selector link is located, the subscriber circuit is extended to the line relay of the seized selector switch; the equipment in the line finder switch arrangement acting to busy the calling line to the other automatic switches having access thereto. Timing means associated with the selector switch provide a given predetermined time interval following seizure of the link in which the party may initiate the dialling operation to extend the call to a further point in the exchange equipment.

In Figure 1 of the drawings such arrangement is shown in schematic form as being connected to the incoming side of the novel impulse correcting arrangement which is in turn connected for use with a selector switch in an automatic telephone exchange. A pair of impulsing contacts 1 are representative of the dial transmitting contacts of a subscriber and, with the conductors 2 and 3, is representative of the seizing circuit extended to the selector as a call is initiated. Line relays 10 and 20, which may be the time relays of the selector switch, are shown as being responsive to the combined seizing and impulsing circuit. A hold relay 30 responds to the initial operation of the line relays 10 and 20 and is slow to release whereby it holds operated during the receipt of a series of impulses representing a digit.

A trigger relay 60 (which is part of the timer relay sequence) and a pulse hold relay 70 are also operative on seizure to prepare the impulse corrector outgoing circuits to the selector counting chains and transfer relays "F."

The timer relay set includes an initial sequence relay 40, a second sequence relay 50, and a trigger relay 60. With each restoration of the trigger relay 60, the operation in sequence of relays 40, 50 and 60, followed by the release of relays 40 and 50 is effected.

Contacts on these timer relays are connected to control the transmission of impulses over two outgoing impulsing circuits, the first outgoing circuit extending to the so-called "F" relay of the selector. The selector "F" relay is normally arranged to be operated on reception of the first impulse and to be held in such condition during the receipt of the first incoming digit transmitted by the subscriber. The relay is arranged to be restored following termination of receipt of the first digit and to control extension of the calling line to the next switch of the series. In conventional selector circuits an operating circuit is completed to the "F" relay with each deenergization of the line relay during receipt of a digit which relay is slow to release whereby it is arranged to hold during the make period of the impulses. In the event that an extra long make period occurs in a conventional selector, the selector will switch through before the digit is completely received. The provision of corrected impulses over the first circuit herein prevents such occurrence. The second outgoing circuit is arranged to control the counting chain of the selector switch.

It is obvious, of course, that additional contacts on the timer relays could be used to produce impulses of other duration to control other circuits in the switches.

With reference now to Figure 1 of the drawings and the following description, the manner of operation of the novel impulse correction circuit of the invention in providing impulses of predetermined characteristics responsive to receipt of impulses of varied characteristics will become apparent.

With the initial closure of contacts 1, a seizing circuit is extended over conductors 2 and 3 to the line relays 10 and 20 of the switching equipment to effect the series operation thereof. Impulse relay 10 is effective in its operation to control various units in the associated switching equipment which are not pertinent to the present disclosure and accordingly have not been shown hereat. Line relay 20 also serves other functions in the switching equipment, but only the pertinent control circuits are shown in Figure 1. Line relays 10 and 20 operate and line relay 20, at its contacts 21, completes an operating circuit for the hold relay 30 and the trigger relay 60 (negative battery, winding of relay 60, contacts 72, 53, 64 and 21 to positive battery); at its contacts 22 prepares a point in the holding circuit for trigger relay 60, and its contacts 23 interrupts a point in a holding circuit for pulse termination relay 50 (presently inoperative).

Hold relay 30 operates and at its contacts 31 prepares a point in the holding circuit for the pulse termination relay 50, and a point in the holding circuit of relay 60 and at its contacts 32 completes a second operating circuit for the trigger relay 60, which extends from battery over the winding of relay 60, contacts 72 and 32 to ground.

Trigger relay 60 operates, and at its contacts 61 interrupts a point in the operating circuit for the first pulse control relay 40 to prevent the operation thereof responsive to seizure of the correction circuit; at its contacts 62 completes a self-holding circuit extending over contacts 22 and 31 to positive battery; at its contacts 63 completes an operating circuit for the pulse hold relay 70 (negative battery, winding of relay 70, contacts 63, 53 and 32 to positive battery), and at its contacts 64 interrupts a point in its first operating circuit.

Pulse hold relay 70 operates and at its contacts 72 interrupts a further point in the second operating circuit for the trigger relay 60, at its contacts 71 provides a locking circuit for itself and prepares an operating circuit for the set of sequence timer relays 40, 50 and 60; at its contacts 73 prepares the first outgoing impulsing circuit (in this example the operating circuit for the "F" relay of the associated switch) and at its contacts 74 prepares the second outgoing impulsing circuit for impulse transmission which extends to the selector counting chain.

Thus with seizure of the equipment by a substation such as indicated by contacts 1 over the loop comprising conductors 2 and 3, the line relays 10 and 20, circuit hold relay 30, trigger relay 60 and pulse hold relay 70 are energized and maintained in the operated condition pending receipt of the operating impulses from the subscriber substation.

As the incoming circuit is interrupted by the dial contacts 1 in the transmission of the first impulse, the energizing circuit for the line relays 10 and 20 is interrupted and the relays are responsively restored. Line relay 20 at its contacts 21 interrupts the energizing circuit for the hold relay 30; at its contacts 22 interrupts the holding circuit for the trigger relay 60; and at its contacts 23 prepares a holding circuit for the pulse terminating relay 50.

Trigger relay 60 restores to set off the timer relays in a given predetermined operating sequence whereby the transmission of corrected pulses over the outgoing pulsing circuits is effected.

Specifically, with restoration of the trigger relay 60 and closure of the associated contacts 61 an energizing circuit is completed to the initial sequence relay 40 of the pulse timer relay set. Trigger relay 60 at its contacts 62 opens a further point in its holding circuit, and at its contacts 64 provides a momentary pulse to relay 30 over the following circuit: negative battery, winding of relay 30, contacts 64, contacts 53, contacts 32, to positive battery, and at its contacts 65 closes the outgoing pulsing circuit to the "F" relay of the associated selector or connector equipment.

Initial sequence relay 40 at its contacts 42 completes an obvious operating circuit for the second sequence relay 50, and at its contacts 43 completes the second outgoing pulsing circuit which extends to the selector counting chain to initiate the transmission of the make period of the first pulse thereover.

The hold relay 30 for the circuit is slow to release and will normally hold up during the open period of the incoming impulses. As an aid to holding during receipt of impulses having extra long breaks, contacts 41 on the first sequence relay 40 complete an auxiliary holding circuit for relay 30.

The second sequence relay 50 operates over the obvious energizing circuit completed by contacts 42, and at its contacts 51 completes a self-holding circuit which extends under the control of the line relay 20, the circuit extending from negative battery over the winding of relay 50 and contacts 51, 23, and 31 to positive battery. Second sequence relay 50 at its contacts 52 completes an operating circuit for the trigger relay 60 which in its responsive operation becomes a part of the sequence set for pulse determination purposes; at its contacts 53 opens its pulse circuit to relay 30; at its contacts 54 connects further ground to the first outgoing pulsing circuit; and at its contacts 55 connects further ground to the second outgoing pulsing circuit.

Trigger relay 60 now operates in the sequence and at its contacts 61 interrupts the energizing circuit for the initial sequence relay 40, at its contacts 62 prepares a self-holding circuit to be controlled by line relay 20; and at its contacts 65 interrupts application of ground to the first outgoing impulse circuit at that point. The outgoing impulse is continued by reason of the ground application at contacts 54 on the second sequence relay 50.

The initial sequence relay 40 restores and at its contacts 41 interrupts the application of ground to the hold relay 30; at its contacts 42 interrupts the energizing circuit for the second sequence relay 50; and at its contacts 43 interrupts the application of ground at one point to the second outgoing impulsing circuit. The outgoing impulse is continued by the ground application effected at closed contacts 55.

If the line relay 20 has not been reoperated by receipt of the make portion of the impulse at this time, the second sequence relay 50 will be maintained operated by the holding circuit extending over contacts 51, 23, and 31 to ground until such time as the line relay 20 is reenergized.

If, however, the line relay 20 has already energized as the initial sequence relay 40 restores, such holding circuit will be interrupted at open contacts 23 and the circuit of the second sequence relay 50 will be opened immediately and slow release relay 50 will release.

With the restoration of the second sequence relay 50, contacts 51 are opened to interrupt a further point in its self-holding circuit, contacts 52 are opened to interrupt a point in the energizing circuit for the trigger relay 60, and contacts 54 interrupt the application of ground to the first outgoing pulsing circuit to terminate the transmission of the first outgoing pulse thereover. The second sequence relay 50 is also effective at its contacts 55 to interrupt the application of ground to the second outgoing pulse circuit and the transmission of the make period of the pulse thereover is terminated. The second sequence relay 50 in its restoration thus terminates the transmission of the pulses over both of the outgoing circuits.

Although the operating circuit for trigger relay 60 is interrupted by the opening of contacts 52 with the restoration of pulse termination relay 50, it is noted that the pulse termination relay 50 will not restore until such time as the line relay 20 has operated. Accordingly a holding circuit for the trigger relay 60 is always completed over contacts 62, 22 and 31 to ground and the trigger relay 60 is always prepared (or cocked) for operation with receipt of a subsequent incoming impulse prior to termination of the previous outgoing impulse.

It is apparent from the foregoing description that the trigger relay 60 is involved in the timing of the duration of the outgoing corrected impulses and is additionally maintained in the energized condition following transmission of such outgoing pulses whereby it is prepared for its ancillary function as a trigger relay for the sequence set as the next incoming pulse is received.

It is also apparent from the foregoing description that the length of the impulse over the first outgoing circuit is initiated with the release of the trigger relay 60 whereas the impulse over the second outgoing pulsing circuit is initiated with the operation of the initial sequence relay 40. Both impulses however are terminated with the release of the second sequence relay 50. The release of the pulse termination relay 50 in this modification is in turn partially dependent upon the nature of the incoming impulses; that is, in the event that the incoming pulse has a shorter than normal break period the line relay 20 will be operated as the energizing circuit for the second sequence relay 50 is opened, and in such event the outgoing impulses will be terminated with the release of the second sequence relay 50. The duration of the outgoing impulse over the first impulsing circuit is thus determined by the time for operation of the initial sequence relay 40, the operating time of the pulse termination relay 50, the operating time of the trigger relay 60, the release time of the initial sequence relay 40, and the release time of the pulse terminating relay 50.

In the event that the incoming impulse has a break period of normal or longer duration, the line relay 20 will be in the restored condition as the second sequence relay 50 attempts to restore and the relay 50 will therefor be maintained energized over the circuit extending from negative battery over the winding of relay 50, contacts 51, 23 and 31 to ground. The outgoing impulses on the two outgoing circuits will be thus extended beyond the established minimum impulse length by an amount which is determined by the duration of the break period of the incoming impulse which is effected subsequent to the normal release of relay 50.

Upon termination of the outgoing impulse, the line relays 10 and 20, hold relay 30, and trigger relay 60 and pulse hold relay 70 are in the operated condition. Such condition prevails during the make period of the impulse. With receipt of the break portion of the second impulse the line relays 10 and 20 restore to effect interruption at contacts 22 of the holding circuit for the trigger relay 60 which restores to set off the relay timing sequence for generation of a second outgoing impulse.

Operation of the impulsing circuit in this manner continues responsive to reecipt of the impulses over the incoming circuit.

Following receipt of the break portion of the last incoming pulse, the line relays 10 and 20 and hold relay 30 are maintained operated in an obvious manner. Trigger relay 60 and pulse hold relay 70 are also held in the operated condition.

Restoration of the circuit is effected with interruption of the incoming line circuit at contacts 1 (or at other contacts not shown) to effect restoration of the line relays 10 and 20. With the restoration of the line relays 10 and 20, contacts 21 are operated to interrupt the energizing circuit for the circuit hold relay 30 which after a predetermined interval restores. Line relay 20 at its contacts 22 also interrupts the holding circuit for the trigger relay 60 to effect the restoration thereof. Hold relay 30 restores and at its contacts 31 effects the further interruption of the hold circuit for the trigger relay 60 and at its contacts 32 interrupts the holding circuit for the pulse hold relay 70 to effect the restoration thereof.

A further modification of the arrangement whereby the circuit is adapted for use with a trunk repeater circuit is set forth in Figure 2, it being assumed that the incoming side of the arrangement in such event is connected to the incoming communication link and that the outgoing loop circuit of Figure 2 is connected to the associated repeater.

The operation of the impulsing correction equipment is basically unaltered, the variation in operation appearing in the outgoing circuit. Briefly, with seizure of the arrangement the relay operating sequence is as before:

20—[30 / 60—70]

Hold relay 30 in operating is now additionally at contacts 33 to complete a seizing circuit to the repeater over contacts 33, 44 and 56.

As the incoming impulses are received the corresponding corrected impulses are generated by the arrangement, the outgoing pulse being effected by the contacts 44 and 56 on the first and second sequence relays 40 and 50. The operating sequence of the relays is as before, that is:

(20)—(60)—40—50—60—(40)——(50)

(20)—(60)—40—50—60—(40) 20————(50)

It is apparent therefrom that the duration of an outgoing pulse with receipt of a shorter than normal pulse break is determined by the operating times of relays 40, 50 and 60 and the release times of relays 40 and 50 as before.

An outgoing impulse responsive to receipt of a normal or longer than normal incoming pulse break will be longer by an amount which is determined by the period the line relay 20 is released after the operating circuit for the second sequence relay 50 is interrupted at contacts 42 plus the operating time of line relay 20.

In releasing the loop the associated repeater is interrupted as the first sequence relay 40 is operated; that is,

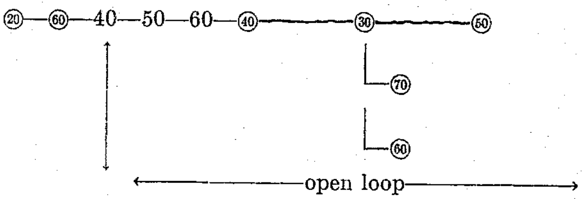

The equipment is now in the restored condition.

While we have illustrated and described what is regarded as the preferred embodiment of the invention, nevertheless it will be understood that such illustration is merely exemplary and that numerous modifications may be made therein without departing from the essence of the invention.

What is claimed is:

1. An impulse correcting arrangement comprising an incoming and an outgoing circuit, a set of relays, sequence control means for controlling said relays to operate in a given sequence to measure a predetermined time period, means for operating one of said relays immediately with receipt of each impulse over said incoming circuit, means controlled responsive to operation of said one relay to energize said relay set, means operative to connect said one relay for further operation in each operating sequence initiated thereby, and impulsing means operated for a period as measured by said relays alone to transmit an impulse of a corresponding duration over said outgoing circuit.

2. An impulse correcting arrangement comprising an incoming and outgoing circuit, a timer set comprised of not more than three relays, each of which has predetermined operating characteristics, sequence control means for connecting said three relays for operation in a given sequence to measure a predetermined time period corresponding to the operating characteristic of said relays alone, means for connecting one of said relays in said set for immediate operation responsive to receipt of each impulse over said incoming circuit, means controlled by said one relay in its operation to energize said relay set, means operative to connect said one relay for operation with the other two relays following initiation of operation of the set by said one relay, and means operated to transmit an impulse over said outgoing circuit of a duration corresponding to a time period determined by only said three sequence relays.

3. An impulse correcting arrangement as set forth in claim 2 in which said means for controlling said one relay is operative with seizure of the impulse corrector arrangement over said incoming circuit to complete an energizing circuit for said one relay, and is operative to interrupt said energizing circuit with receipt of each incoming impulse thereafter; and whch includes means operative responsive to restoration of said one relay to initiate operation of said relay sequence, and means associated with said sequence control means operative to effect energization of each of said three relays once and release of the other two of said relays in each operating sequence.

4. In an impulse correcting arrangement comprising an incoming and outgoing circuit, a set of three relays interconnected to operate in a given sequence with energization thereof to measure a predetermined time period as determined by the operating characteristics of only said relays, line relay means connected to the incoming circuit, means controlled by said line relay means for energizing one of said relays in said set immediately with seizure thereof over said energizing circuit and for restoring same with each receipt of an impulse over said incoming circuit, means controlled by said one relay in its restoration to initiate operation of said relay set, sequence control means operative with operation of said set to effect energization of each of said three relays in sequence and the release of the other two of said relays, and impulse transmitting means operated by said relays to transmit an impulse over said outgoing circuit for said period measured by said sequence relays alone.

5. An impulse correcting arrangement as set forth in claim 4 which includes circuit conditioning means for preparing said outgoing circuit for impulse transmission, means controlled by said one relay in its operation responsive to seizure of the equipment to operate said circuit conditioning means, and means for maintaining said circuit conditioning means operative for the period of receipt of each incoming impulse set.

6. An impulse correcting arrangement comprising an incoming and outgoing circuit, a timer set comprised of not more than three relays, each relay having predetermined operating characteristics, sequence control means for connecting said three relays for operation in a given sequence to measure a predetermined time period corresponding to the operating characteristic of said relays alone, means for connecting one of said relays in said set for immediate operation responsive to receipt of each impulse over said incoming circuit, means controlled by said one relay in its operation to energize said relay set, means operative to connect said one relay for operation with the other two relays following initiation of operation of the set by said one relay, means operated to transmit an impulse over said outgoing circuit of a duration corresponding to the time period determined by said three sequence relays alone, and means for altering the operating time of one of said three relays in said sequence whenever said incoming impulse is of greater duration than a predetermined value.

7. An impulse correcting arrangement as set forth in claim 6 in which said means for altering the operating time of one of said three relays comprises means for delaying the operating time of the last relay to operate in said sequence whenever said incoming impulse is of greater duration than a predetermined value.

8. In an impulse correcting arrangement, an incoming circuit, a plurality of outgoing circuits, a set of timer relays connected to operate in a given sequence, means for operating one of said relays in said sequence with receipt of an incoming impulse over said incoming circuit, means controlled responsive to operation of said one relay to initiate operation of said sequence set, means for connecting said one relay for reoperation in each sequence operation initiated thereby, and impulsing means connected in each of said plurality of outgoing circuits controlled by said sequence set of relays to provide in said plurality of outgoing circuits corrected outgoing impulses of predetermined values based only on the operating characteristics of said relays.

9. An arrangement as set forth in claim 8 which includes means for connecting said impulsing means in the different outgoing circuits for operation by said sequence set for different time periods.

10. An impulse correcting arrangement as set forth in claim 8 which includes means for connecting said impulsing means in the different outgoing circuits for impulse initiating operations by said sequence relays at different times and for impulse terminating operations at the same time.

11. In an automatic telephone system including an automatic switch for extending communication links between the subscribers in the exchange, said switch including at least a counting chain and a hold relay which is connected to maintain the switch in a given condition for the period of receipt of each set of incoming impulses; an incoming circuit, a first control circuit connected to said hold relay, a second control circuit connected to said counting chain, an impulse correcting arrangement comprising a set of timer relays connected to be operated in a given sequence to measure a time period corresponding to the operating characteristics of said relays alone, means controlled with seizure of said switch and responsive to each impulse received over said incoming circuit to effect operation of one of said timer relays, means controlled by said one timer relay in its operation, to initiate operation of said relays in said given sequence, means for connecting said one relay in said sequence set for reoperation in each operating sequence initiated thereby, a first means controlled by said relays alone in each sequence operation to transmit a corrected impulse of a first predetermined value over said first circuit for operating said counting chain, and a second means controlled by said sequence set alone in its operation to provide an impulse of a duration different than said first impulse for transmission over said second circuit to control said switch holding relay.

12. An impulse arrangement as set forth in claim 11 which includes a third outgoing circuit, and a third means controlled by said sequence set alone in its operation to transmit over said third circuit an impulse of a duration different than said first and second impulses.

References Cited in the file of this patent

UNITED STATES PATENTS

| | | |
|---|---|---|
| Re. 20,496 | Dunham | Sept. 7, 1937 |
| 1,589,409 | Miller | June 22, 1926 |
| 2,061,802 | Kroll et al. | Nov. 24, 1936 |
| 2,487,252 | Lomax et al. | Nov. 8, 1949 |
| 2,495,725 | Horwitz | Jan. 31, 1950 |
| 2,500,286 | Jones | Mar. 14, 1950 |
| 2,500,289 | Kessler | Mar. 14, 1950 |